Dec. 18, 1928.
R. M. WOYTYCH
1,695,752
WORKHOLDER
Original Filed Feb. 4, 1925
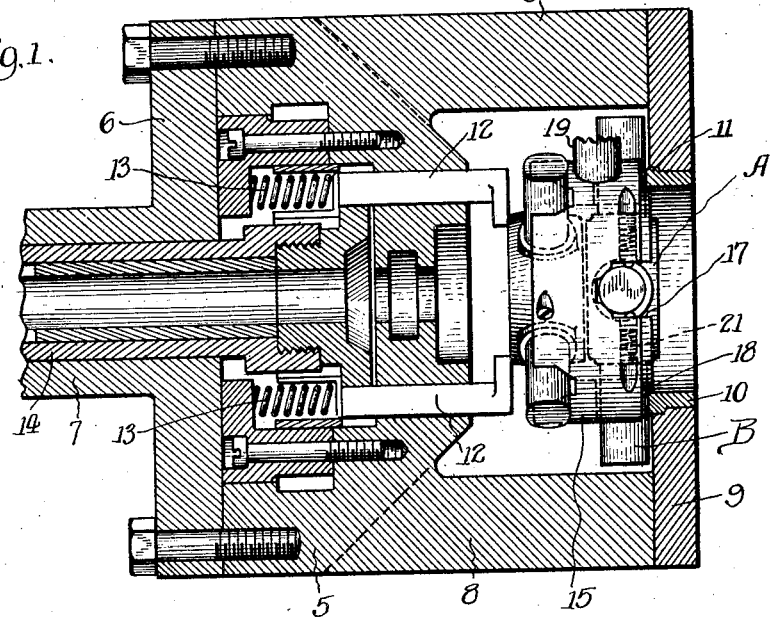
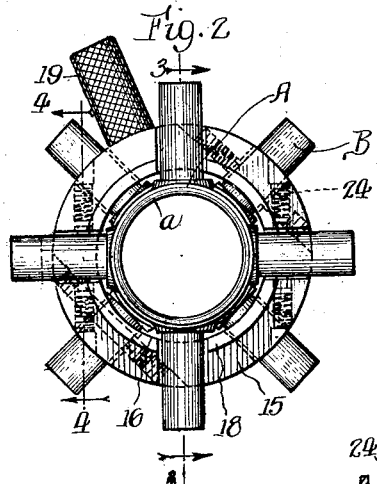
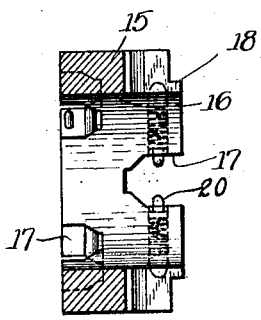
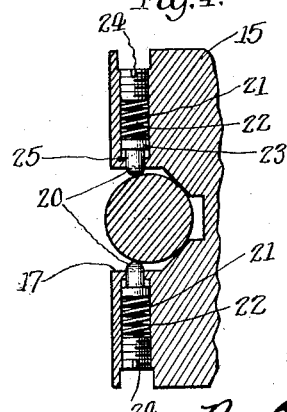
Inventor:
Raymond M. Woytych Patented Dec. 18, 1928.

1,695,752

UNITED STATES PATENT OFFICE.

RAYMOND M. WOYTYCH, OF FOND DU LAC, WISCONSIN, ASSIGNOR, BY MESNE ASSIGNMENTS, TO THE HEALD MACHINE COMPANY, OF WORCESTER, MASSACHUSETTS, A CORPORATION OF MASSACHUSETTS.

WORK HOLDER.

Application filed February 4, 1925, Serial No. 6,674. Renewed October 11, 1928.

The invention relates to improvements in workholders for machine tools, particularly portable holders or shuttles in which the work blanks are adapted to be centered and clamped, and which are adapted to be similarly supported in the machine chuck.

The primary object of the invention is to provide a novel method of a shuttle for holding one or more spiders or other similarly shaped work blanks in a machine chuck.

A detailed object is to provide a shuttle of the above character which is simple in construction, easily loaded and unloaded, and accurate in use.

Further objects and advantages will become apparent as the description proceeds.

In the accompanying drawings, Figure 1 is a sectional view of a chuck with a shuttle embodying the features of my invention mounted therein.

Fig. 2 is an end view of the shuttle with two spiders mounted therein.

Fig. 3 is a sectional view of the shuttle without the spiders taken along line 3—3 of Fig. 2.

Fig. 4 is a detailed sectional view taken along line 4—4 of Fig. 2.

While the invention is susceptible of various modifications and alternative constructions, I have shown in the drawings and will herein describe in detail the preferred embodiment, but it is to be understood that I do not thereby intend to limit the invention to the particular form disclosed, but aim in the appended claims to cover all modifications and alternative constructions falling within the spirit and scope of the invention.

In the exemplary embodiment, the invention contemplates the provision of a chuck of suitable construction such as the one shown in Figure 1 in which the shuttle is adapted to be mounted. The chuck comprises a body 5 which is secured to a disk 6 on the forward end of a rotatable spindle 7, and which is formed with a pair of diametrically opposed and forwardly extending arms 8. A front plate 9 is secured to the arms 8, and is provided with a bushing 10 having a centering flange 11 and being concentric about the axis of rotation.

Slidably mounted in the body for reciprocatory movement toward and from the bushing 10 are a plurality of clamping members 12 spaced about the center of the chuck. These members are pressed forwardly resiliently by a plurality of coiled springs 13, and are adapted to be retracted by means of a draw rod 14 extending through a spindle 7.

The shuttle clamped in the chuck comprises a body 15 which preferably is cylindrical in form and which is provided with a central bore 16 adapted to receive two spiders, one in each end. Each spider is formed with a hub A having a bore $a$ to be ground, and with a plurality of arms B extending outwardly from the hub. In the present instance, four arms B are provided and these are adapted to engage in a like number of radial notches 17 formed in the opposite ends of the body 15. One end of the body is provided with a pilot ring 18 adapted to fit into the bushing 10 to center the shuttle in the chuck. A handle 19 threaded into the outer peripheral surface of the body 15 provides means for handling the shuttle in placing it into the chuck or removing it therefrom.

Preferably the notches 17 in opposite ends of the body 15 are disposed alternately or in staggered relation. Each notch is V-shaped at its root to definitely determine the position of the arms B. The arms B are held in position in the body 15 while the shuttle is being placed into the chuck or removed therefrom by means of a plurality of plungers 20 mounted in opposite sides of certain of the notches 17 and adapted to engage opposite sides of said arms just beyond their center. As many of the notches 17 are provided with these plungers as may be desired. In the present instance, two opposed notches in each end of the body 15 are so equipped.

The plungers 20 of each pair are mounted in bores 21 opening into opposite side of the associated notch, and are pressed inwardly by coiled springs 22 disposed between heads 23 on the plungers and nuts 24 threaded into the outer ends of the bores. The heads 23 are adapted to engage shoulders 25 in the bores 21 to limit the movement of the plungers 20.

The outer sides of the arms B of each spider project beyond the ends of the body 15, and those of the foremost spider are adapted to directly engage the flange 11 of the bushing 10, thereby squaring up both spiders with respect to the axis of rotation. The clamping members 12 directly engage the hub A of the rear spider to hold the shuttle and spiders in position in the chuck.

From the foregoing it will be evident that the method comprises mounting a pair of spiders in a shuttle, one in each end with the arms of the spiders extending through but projecting laterally from notches in said ends to center and square up the spiders in the shuttle, and centrally mounting the shuttle in an end clamping chuck with one spider engaging the clamping surface of the chuck to square up the spiders in the chuck and with the other spider being engaged by the clamping means of the chuck to hold the shuttle and spiders rigidly in position.

The shuttle is extremely simple in construction, and permits one or more spiders or other similarly shaped work blanks to be quickly and accurately mounted in a chuck. Complicated clamping means in the shuttle are unnecessary since the shuttle serves primarily to position the blanks in the chuck and the chuck does the clamping.

I claim as my invention:

1. A shuttle for holding spiders comprising, in combination, a body having a central bore adapted to receive the hubs of a pair of spiders one in each end, and having a plurality of notches in its opposite ends adapted to receive the arms of said spiders, said notches serving to center and square up said spiders, and means for holding said spiders in position.

2. A shuttle for holding work blanks having a central portion and a plurality of extensions, comprising, in combination, a body adapted to receive the central portions of said work blanks one in each end, and having a plurality of notches in its opposite ends adapted to receive said projections, and means for holding said work blanks in position.

3. A shuttle for holding spiders comprising, in combination with an end clamping chuck, a body having a central bore adapted to receive the hubs of two spiders one in each end and having a plurality of notches in its opposite ends adapted to partly receive the arms of said spiders to center and square up the same in the shuttle, the arms of one spider being adapted to engage the clamping face of the chuck to square up the two spiders in the chuck and the other spider being adapted to be engaged by the clamping means of the chuck.

4. A shuttle for holding irregular work blanks comprising a body constructed to receive two work blanks one in each end and having a plurality of notches in its opposite ends adapted to receive projections on said work blanks, said notches being of such depth that the work blanks project slightly beyond the ends of said body to adapt them to be engaged by the clamping parts of a chuck to square up and clamp the shuttle and work blanks therein.

5. A shuttle for holding irregular work blanks comprising, in combination, a body adapted to receive the work blanks one in each end and having a plurality of notches in its ends adapted to receive projections on said blanks to square up said blanks in the shuttle, said notches being of such a depth that the blanks project slightly beyond the ends of said body to adapt them to be engaged by the opposed end clamping means of a chuck to square up and clamp the shuttle and blanks in the chuck, and means for yieldingly retaining said blanks in said body.

6. A shuttle for spiders comprising, in combination, a body having a central bore adapted to receive the hub of a spider, and having a plurality of V-shaped notches adapted to receive the arms of said spider to center and square up the same, said notches being of such a depth that the outer sides of the arms of said spider project laterally therefrom to adapt them to engage the clamping face in a chuck, and spring pressed means mounted in certain of said notches for holding said arms therein.

7. A shuttle for holding spiders comprising, a body adapted to receive the hub of a spider and having a plurality of notches adapted to receive the arms of said spider, said notches being of such a depth that said arms project laterally therefrom beyond the end of said body, and serving to center and square up the spider in said body.

8. The method of holding spiders comprising mounting a pair of spiders one in each end of a shuttle with the arms of said spiders positioned in but projecting laterally from notches in opposite ends of said shuttle, and clamping said shuttle in a chuck with one of said spiders engaging the clamping face of said chuck to square up said shuttle and spiders in said chuck, and the other spider being engaged by the clamping means of said chuck to hold the parts rigidly in position.

9. The method of chucking spiders comprising mounting the hubs of said spiders in opposite ends of a shuttle with the arms of said spider fitting into but projecting laterally from notches in the ends of said body to square up the spiders in said shuttle, and mounting said shuttle in an end clamping chuck with one spider engaging the clamping face of said chuck to square up said shuttle and spiders in said chuck and with the other spider being engaged by the clamping means of said chuck to hold said shuttle and spiders in centered position.

10. The method of chucking irregular work pieces having a central portion and one or more lateral projections, comprising mounting the work piece in one end of a shuttle with the projection or projections of the work piece positioned in but having the outer side or sides thereof projecting beyond notches in one end of the shuttle, the notches, serving to square up the work piece in the shuttle, and clamping said shuttle in a chuck with the outer side or sides of said projection or projections engaging one of the clamping surfaces of the chuck to hold the shuttle and the work piece in centered relation in the chuck.

11. A portable shuttle adapted to be clamped in a chuck, said shuttle comprising a body having a plurality of spaced notches in one end adapted to receive the projections of a work blank, said notches serving to square up said blank in said body and being of such depth that the sides of said projections project laterally therefrom for engagement by a clamping element of said chuck.

12. A shuttle for holding work blanks having outwardly extending projections, said shuttle comprising, in combination, a body having a plurality of notches in one end adapted to receive said projections, and means in said body for engaging certain of said projections to clamp the latter in said notches.

In testimony whereof, I have hereunto affixed my signature.

RAYMOND M. WOYTYCH.